United States Patent
Frazier et al.

(10) Patent No.: US 10,324,728 B2
(45) Date of Patent: Jun. 18, 2019

(54) LIGHTWEIGHT INTERRUPTS FOR CONDITION CHECKING

(71) Applicant: International Business Machines Corporation, Armonk, NY (US)

(72) Inventors: Giles R. Frazier, Austin, TX (US); Michael Karl Gschwind, Chappaqua, NY (US); Christian Jacobi, Poughkeepsie, NY (US); Chung-Lung K. Shum, Wappingers Falls, NY (US); Joran S. C. Siu, Thornhill (CA); Timothy J. Slegel, Staatsburg, NY (US); Zhong L. Wang, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 336 days.

(21) Appl. No.: 14/972,219

(22) Filed: Dec. 17, 2015

(65) Prior Publication Data
US 2017/0177372 A1    Jun. 22, 2017

(51) Int. Cl.
G06F 9/38 (2018.01)
G06F 11/36 (2006.01)
G06F 9/30 (2018.01)
G06F 11/07 (2006.01)

(52) U.S. Cl.
CPC .......... *G06F 9/3861* (2013.01); *G06F 9/3005* (2013.01); *G06F 11/0757* (2013.01); *G06F 11/36* (2013.01)

(58) Field of Classification Search
CPC ............. G06F 9/30054; G06F 9/30058; G06F 9/30145; G06F 9/30167; G06F 9/3861; G06F 9/3836; G06F 9/4812; G06F 9/4831; G06F 9/4837; G06F 3/1263
USPC .......................................................... 712/244
See application file for complete search history.

(56) References Cited

U.S. PATENT DOCUMENTS

| | | | | | |
|---|---|---|---|---|---|
| 5,278,782 | A | * | 1/1994 | Nakano | G06F 7/5525 708/500 |
| 5,305,455 | A | * | 4/1994 | Anschuetz | G06F 9/4812 710/200 |
| 5,692,170 | A | * | 11/1997 | Isaman | G06F 9/3861 710/260 |

(Continued)

OTHER PUBLICATIONS

Hennessy, John L., and David A. Patterson. Computer Architecture: a Quantitative Approach. Elsevier Morgan Kaufmann, 2011.*

(Continued)

*Primary Examiner* — Eric Coleman
(74) *Attorney, Agent, or Firm* — Cantor Colburn LLP; Steven Chiu

(57) ABSTRACT

Embodiments relate to lightweight interrupts for condition checking. An aspect includes determining, by a condition checker in a computer system, that a condition occurs for an application executing on the computer system. Another aspect includes, based on determining that the condition occurs for the application, determining whether lightweight interrupts are enabled. Yet another aspect includes based on determining that lightweight interrupts are enabled, issuing a lightweight interrupt to the application and handling the instruction by the application.

20 Claims, 4 Drawing Sheets

(56) References Cited

U.S. PATENT DOCUMENTS

| | | | | |
|---|---|---|---|---|
| 6,625,693 | B2* | 9/2003 | Arora | G06F 9/3861 |
| | | | | 711/125 |
| 6,647,489 | B1* | 11/2003 | Col | G06F 9/30058 |
| | | | | 712/226 |
| 6,792,492 | B1 | 9/2004 | Griffin | |
| 6,892,295 | B2 | 5/2005 | Saulsbury | |
| 7,849,465 | B2 | 12/2010 | Zou et al. | |
| 2003/0005423 | A1 | 1/2003 | Chen et al. | |
| 2004/0117803 | A1* | 6/2004 | Srivastava | G06F 9/3861 |
| | | | | 719/318 |
| 2006/0149952 | A1* | 7/2006 | Blinick | G06F 9/3861 |
| | | | | 712/244 |
| 2010/0169894 | A1 | 7/2010 | Sheaffer et al. | |
| 2010/0174893 | A1* | 7/2010 | Rivera | G06F 9/38 |
| | | | | 712/244 |
| 2010/0180279 | A1* | 7/2010 | Yajima | G05B 19/056 |
| | | | | 718/103 |
| 2010/0312991 | A1* | 12/2010 | Norden | G06F 9/3001 |
| | | | | 712/205 |
| 2011/0296229 | A1* | 12/2011 | Cowlishaw | G06F 7/49905 |
| | | | | 714/2 |
| 2014/0075238 | A1* | 3/2014 | Dupont | G06F 1/14 |
| | | | | 713/502 |

OTHER PUBLICATIONS

Seongsoo Hong et al., "ARX/ULTRA: A New Real-Time Kernel Architecture for Supporting User-Level Threads", Technical Report SNU-EE-TR-1997-3, School of Electrical Engineering, Seoul National University, 1997.

* cited by examiner

LIGHTWEIGHT INTERRUPTS FOR CONDITION CHECKING

BACKGROUND

The present invention relates generally to computer processor systems, and more specifically, to lightweight interrupts for condition checking in a computer processor system.

In computer systems that require a variety of system functions to be controlled in a nonsequential fashion, it is a common practice to employ interrupts to determine the order in which various operations are to be performed by the processor. An interrupt is generated in response to the occurrence of a predetermined event in the operation of the system. When the processor receives an interrupt request, it stops its present operation at an appropriate point and proceeds to a predetermined subroutine that controls the function associated with that particular interrupt. The predetermined condition may be an exception condition in the processor. The occurrence of an exception may result in generation of an interrupt that passes control from an application that was running at the time the exception occurred to supervisor software, so that the supervisor software can handle the exception. However, processing of interrupts by the supervisor software may negatively impact performance of the computer system.

A compiler or an application program may insert checking instructions into compiled code, such as pointer bounds checks, array index checks, and zero checks. Various special instructions may be used to perform such checking. However, detection of conditions that do not meet the checking criteria by the special instructions cause supervisor interruptions, which may impact performance. Additionally, the special instructions take time to execute and increase code footprints. An alternative to using special checking instructions is to include explicit bounds checking instructions such as register compares and conditional branches in in-line code that check each result to determine if it is within an acceptable bound. However, such explicit checks may require multiple instructions that significantly increase code footprint, take time to execute, and must be repeated each time checking needs to be performed.

SUMMARY

Embodiments include a method, system, and computer program product for lightweight interrupts for condition checking. An aspect includes determining, by a condition checker in a computer system, that a condition occurs for an application executing on the computer system. Another aspect includes, based on determining that the condition occurs for the application, determining whether lightweight interrupts are enabled. Yet another aspect includes based on determining that lightweight interrupts are enabled, issuing a lightweight interrupt to the application and handling the instruction by the application.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of lightweight interrupts for condition checking are provided, with exemplary embodiments being discussed below in detail. Embodiments provide a condition checker that performs condition checking, such as whether operands of various instructions meet certain predetermined criteria during application execution, and generates a lightweight interrupt to the application when the predetermined criteria are not met. The lightweight interrupt may be an event based branch (EBB) in some embodiments. For example, the condition checker can be configured to determine if the value of data loaded by a load instruction is outside of a given range or whether the value of the result of an arithmetic instruction is outside of a given range, and cause a lightweight interrupt if the value is outside of the range. Further embodiments of the condition checker may perform implicit checks that are not associated with any instruction. Such implicit checks may include asynchronous notifications regarding execution timers, or any other types of timers. Use of lightweight interrupts handles condition checking without supervisor involvement, and also does not require insertion of in-line bounds checks such as compare and branch instructions into application source code.

Embodiments of a condition checker include a set of instructions that compares two values and cause a lightweight interrupt if the relationship between the two values does not meet a certain condition. The values that are compared may comprise any appropriate values, such as contents of a register in the processor, or a value that is specified in an instruction. In further embodiments, the condition checker may determine whether a pointer that is loaded indicates an address outside of a particular address range. The instructions in the condition checker that generate lightweight interrupts may further include, but are not limited to, zero checks, overflow checks, and value comparison checks. These instructions may be used by higher level functions that check for occurrences of division by zero, array indices out of bounds, and other types of events.

Figure 1:
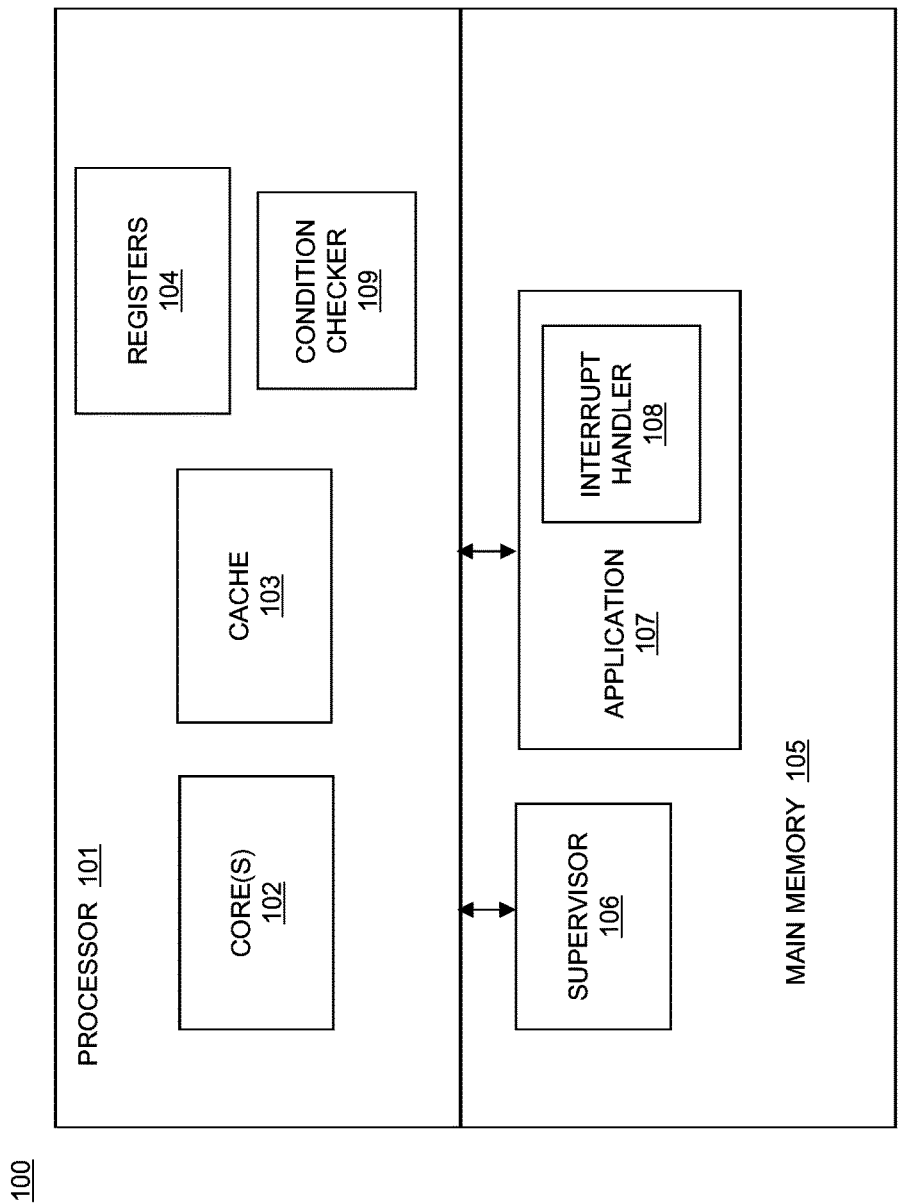
FIG. 1 depicts a computer system for lightweight interrupts for condition checking in accordance with an embodiment.

FIG. 1 depicts a computer system for implementing lightweight interrupts for condition checking in accordance with an embodiment. Computer system 100 includes a processor 101 in communication with a main memory 105. The processor 101 includes one or more cores 102 that execute instructions using cache memory 103. Computer programs, such as supervisor 106 and application 107, are stored in main memory 105 and executed by the processor 101. The supervisor 106 may include a hypervisor and/or an OS in various embodiments. Any appropriate number of applications may be executed by a computer system such as computer system 100. Processor 101 further includes a plurality of registers 104. Condition checker 109 in processor 101 is used by instructions that are executed during execution of application 107. Condition checker 109 may detect various conditions and issue lightweight interrupts to interrupt handler 108 in application 107 so that the application 107 may handle the detected conditions without involving the supervisor 106. Conditions that are detected by the condition checker 109 may include but are not limited to whether operands of an instruction meet certain criteria, or whether data being loaded by a load instruction indicates a memory location that is not in a particular memory region. Interrupt handler 108 may also receive lightweight interrupts corresponding to asynchronous events that occur in processor 101. The use of lightweight interrupts allows the application 107 to handle detected conditions without having to pass control to the supervisor 106.

Figure 2:
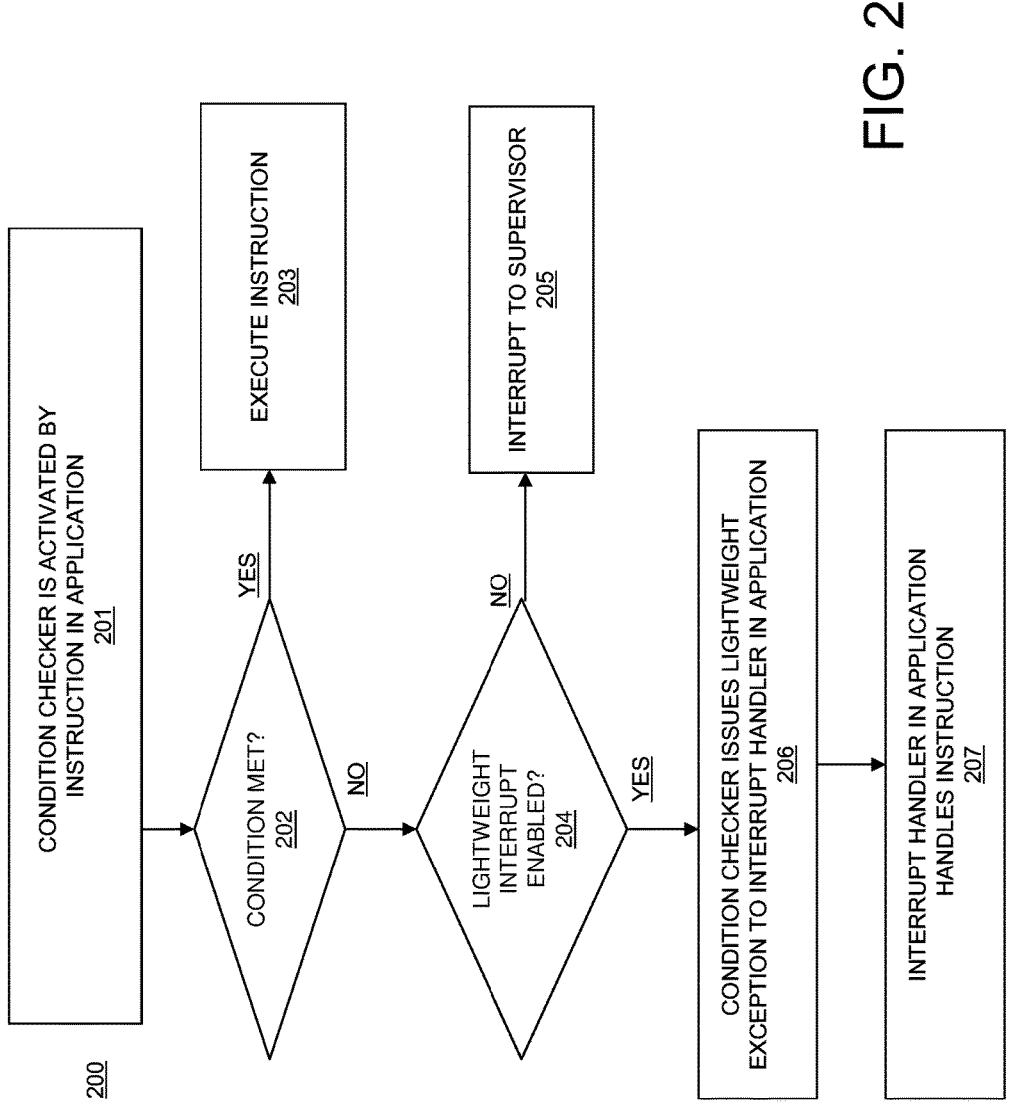
FIG. 2 depicts a process flow for lightweight interrupts for condition checking in accordance with an embodiment.

FIG. 2 illustrates an embodiment of a method 200 for lightweight interrupts for condition checking. Method 200 may be implemented in computer system 100 of FIG. 1. First, in block 201, the condition checker 109 is activated by an instruction being executed in the application 107. Examples of instructions that may activate the condition checker 109 are discussed below in further detail with respect to FIG. 3. Next, in block 202, it is determined whether a particular condition that is being checked for is met by the instruction. For example, the condition checker 109 may check whether operands of the instruction meet certain predetermined criteria with respect to one another, or whether data being operated on by the instruction indicates a memory location that is not in a particular memory region, in various embodiments. If it is determined in block 202 that the instruction meets the criteria, flow proceeds from block 202 to block 203, and the instruction is executed. If it is determined in block 202 that the instruction does not meet the criteria, flow proceeds from block 202 to block 204. In block 204, it is determined whether lightweight interrupts are enabled. This determination may be made based on a lightweight interrupt enable field in the instruction in some embodiments, or based on a lightweight interrupt enable field in a control register of the processor 101 in other embodiments. Such an enable field may be implemented in a branch event status and control register (BESCR) of the processor 101 in some embodiments. In some embodiments, when a lightweight interrupt occurs, a bit indicating that the criterion was not met is set in the BESCR that is accessible to the EBB handler in order to distinguish this particular type of lightweight interrupt from other types of lightweight interrupts.

If it is determined in block 204 that lightweight interrupts are not enabled for the instruction, flow proceeds from block 204 to block 205, and an interrupt that passes control from the application 107 to supervisor 106 is issued, and the supervisor 106 handles the condition. In some embodiments of block 205, under conditions that do not require immediate attention, the supervisor interrupt may not occur and the program may continue uninterrupted. If it is determined in block 204 that lightweight interrupts are enabled for the instruction, flow proceeds from block 204 to block 206. In block 206, a lightweight interrupt is issued to the interrupt handler 108 in the application 107. Then, in block 207, the interrupt handler 108 handles the instruction and takes corrective action that may be necessary as a result of the condition.

Figure 3:
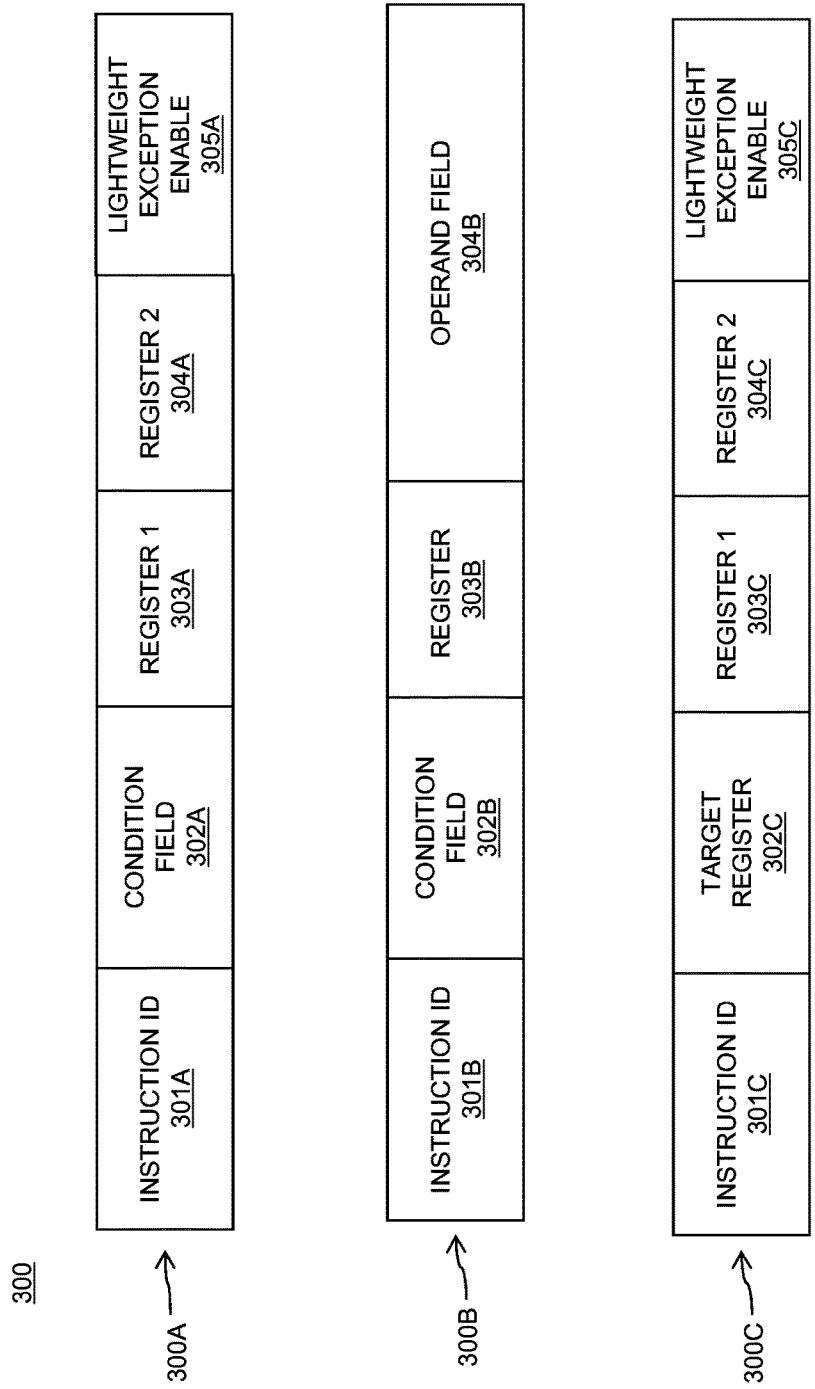
FIG. 3 illustrates embodiments of instructions for lightweight interrupts for condition checking.

FIG. 3 illustrates embodiments of instructions that may be included in a condition checker 109 of FIG. 1. The instructions 300A-C of FIG. 3 are further illustrated in Tables 1-3 below. Instruction 300A of FIG. 3 and Table 1 illustrate an embodiment of a Trap or Branch Word (TOBW) instruction. TOBW instruction 300A includes an instruction identifier (or opcode) 301A, a condition field (BO) 302A, a first register identifier (RA) 303A, a second register identifier (RB) 304A, and a lightweight exception enable field (B) 305A. In some embodiments, BO 302A may comprise a 5-bit field. In the embodiment of Table 1, the sign-extended contents of bits 32-63 of RA are compared to the sign-extended contents of bits 32-63 of RB. Signed comparisons (e.g., $=$, $<$, or $>$) and/or unsigned comparisons (e.g., $<^u$ or $>^u$) may be made in various embodiments. If any bit in the BO field is set to 1 and its corresponding condition is met by the result of the register value comparison, then an EBB is generated to the application 107, or a trap is generated to supervisor 106, based on the value of B. TOBW instruction 300A and Table 1 are shown for illustrative purposes only; a TOBW instruction may make any appropriate comparisons and may have any appropriate format. TOBW instruction 300A can be used for bounds checking, zero checking, and any other appropriate functions. Some embodiments may omit the B field, and instead enable and disable lightweight interrupts by means of a bit in a control register such as a BESCR.

TABLE 1

Trap or Branch Word

TOBW (BO, RA, RB, B)
a ← EXTS(RA)$_{32:63}$
b ← EXTS(RB)$_{32:63}$
if (a < b) and BO$_0$ then if B then EBB else trap
if (a > b) and BO$_1$ then if B then EBB else trap
if (a = b) and BO$_2$ then if B then EBB else trap
if (a <$^u$ b) and BO$_3$ then if B then EBB else trap
if (a >$^u$ b) and BO$_4$ then if B then EBB else trap Instruction 300B of FIG. 3 and Table 2 illustrates an embodiment of a Branch Word Immediate (BWI) instruction. BWI instruction 300B includes an instruction identifier 301B, a condition field (BO) 302B, a register identifier (RA) 303B, and an operand field (SI) 304B. In some embodiments, BO 302B may comprise a 5-bit field. In the embodiment of Table 2, the sign-extended contents of bits 32-63 of RA are compared to the sign extended value of SI. Signed comparisons (e.g., $=$, $<$, or $>$) and/or unsigned comparisons (e.g., $<^u$ or $>^u$) may be made in various embodiments. If any bit in the BO field is set to 1 and its corresponding condition is met by the result of the comparison, then an EBB is generated. BWI instruction 300B and Table 2 are shown for illustrative purposes only; a BWI instruction may make any appropriate comparisons and may have any appropriate format. BWI instruction 300B can be used for bounds checking, zero checking, and any other appropriate functions. Further embodiments of a BWI instruction in a condition checker 109 may compare bytes, doublewords, quadwords, etc. Further embodiments of BWI instruction 300B may include a lightweight exception enable field as discussed above with respect to TOBW instruction 300A.

TABLE 2

Branch Word Immediate

BWI (BO, RA, SI)
a ← EXTS(RA)$_{32:63}$
if (a < EXTS(SI)) and BO$_0$ then EBB
if (a > EXTS(SI)) and BO$_1$ then EBB
if (a = EXTS(SI)) and BO$_2$ then EBB
if (a <$^u$ EXTS(SI)) and BO$_3$ then EBB
if (a >$^u$ EXTS(SI)) and BO$_4$ then EBB Instruction 300C of FIG. 3 and Table 3 illustrates an embodiment of a Load Monitored Region (LMR) instruction. LMR instruction 300C includes an instruction identifier 301C, a target register (RT) 302C, a first register identifier (RA) 303C, a second register identifier (RB), and a lightweight exception enable field 305C. In the embodiment of Table 3, an effective address (EA) of data that is being loaded is determined based on RA and RB. It is determined whether loaded data, when interpreted as a data pointer, indicates a location within a memory region that is being monitored. The region that is being monitored may be specified by a load monitored region register in the processor 101, which may hold a base effective address and a size in some embodiments. If the data loaded, when interpreted as a data pointer, indicates a memory location that is in the monitored region, the data (for example, a double word data pointer) that is addressed by EA is loaded into RT; otherwise (i.e. if the data loaded, when interpreted as a data pointer, indicates a memory location that is outside the monitored region), an EBB occurs.

TABLE 3

Load Monitored Region

Figure 4:
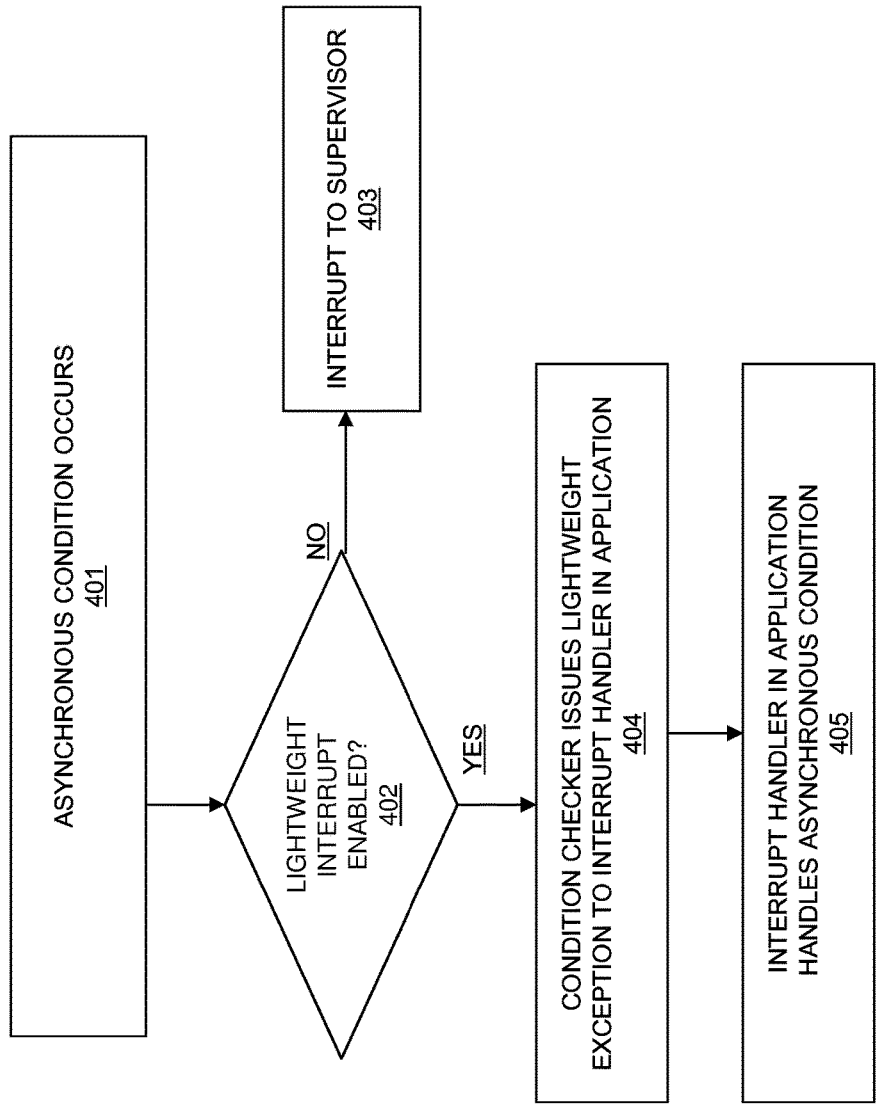
FIG. 4 depicts a process flow for lightweight interrupts for condition checking in accordance with an embodiment.

LMR (RT, RA, RB)
b ← RA
EA ← b + $_{tea}$(RB)
loaded_ea ← MEM(EA, 8)
if loaded_ea is in load monitored region, RT← loaded_ea
    else EBB FIG. 4 illustrates an embodiment of a method 200 for lightweight interrupts for condition checking that provides a lightweight interrupt when an asynchronous condition occurs. First, in block 401, an asynchronous condition occurs in the processor 101 during execution of application 107. Then, in block 402, it is determined whether lightweight interrupts are enabled. This determination may be made based on a lightweight interrupt enable field in a control register of the processor 101 in some embodiments. Such a control bit may be implemented as part of the BESCR in some embodiments. When a lightweight interrupt occurs, a bit in the BESCR that is accessible to the EBB handler specifies whether an asynchronous condition type EBB has occurred in order to distinguish this type of EBB from other types of EBBs, but any method of making this information accessible to the handler may be used in various embodiments.

If it is determined in block 402 that lightweight interrupts are not enabled, flow proceeds from block 402 to block 403, and an interrupt that passes control from the application 107 to supervisor 106 is issued, and the supervisor 106 handles the asynchronous condition. Alternatively, in some embodiments, under conditions that do not require immediate attention such as asynchronous changes in program priority, the supervisor interrupt may not occur and the program may continue uninterrupted. If it is determined in block 402 that lightweight interrupts are enabled, flow proceeds from block 402 to block 404. In block 404, a lightweight interrupt is issued to the interrupt handler 108 in the application 107. Then, in block 207, the interrupt handler 108 handles the asynchronous condition.

In an example of execution of method 400, the supervisor 106 may temporarily boost an application's priority to a level that the application cannot normally use, in order to facilitate performing a particular function by the application. When the application's priority is boosted, the supervisor 106 initializes a boost timer. Once the application's priority is at the boosted level, the application will execute at the boosted priority until the boost timer expires or the program changes its priority back to a normal level. Expiration of the boost timer is an asynchronous condition that may trigger block 401 of method 400, and cause a lightweight interrupt in block 405 of method 400. The lightweight interrupt notifies the application that more time than expected has been spent to perform the particular function, or that the application should not perform the particular functions since it no longer has the boosted priority.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for lightweight interrupts for condition checking, the method comprising:
    determining, by a condition checker in a computer system, that a condition occurs for an application executing on the computer system;
    based on determining that the condition occurs for the application, determining whether lightweight interrupts are enabled in a lightweight interrupt enable field in a particular instruction of the application, the application itself for which the condition occurred also comprising an interrupt handler; and
    based on determining that lightweight interrupts are enabled, issuing a lightweight interrupt to the interrupt handler in the application itself for which the condition occurred and handling the condition by the interrupt handler in the application.

2. The computer implemented method of claim 1, wherein the condition is a determination, by the condition checker, that an instruction of the application does not meet a predetermined criterion.

3. The computer implemented method of claim 2, further comprising, based on determining that lightweight interrupts are not enabled in the lightweight interrupt enable field, issuing an interrupt to supervisor software and handling the instruction by the supervisor software, wherein the supervisor software is separate and distinct from the application.

4. The computer implemented method of claim 2, wherein the instruction comprises a trap or branch word (TOBW) instruction, and the predetermined criterion comprises a relationship between operands of the instruction with respect to a first register identifier and a second register identifier.

5. The computer implemented method of claim 2, wherein the instruction comprises a branch word immediate (BWI) instruction, and the predetermined criterion comprises a relationship between operands of the instruction with respect to a register identifier and an operand field.

6. The computer implemented method of claim 2, wherein the instruction comprises a load monitored range (LMR) instruction, and the predetermined criterion comprises loaded data indicating a memory address that is outside a particular address range.

7. The computer implemented method of claim 1, further comprising, based on the condition being an asynchronous condition occurring on a processor of the computer system, issuing the lightweight interrupt to the interrupt handler in the application to notify the application of the asynchronous condition.

8. The computer implemented method of claim 7, wherein the asynchronous condition comprises expiration of a timer comprising a boost timer that was set by a supervisor in response to temporarily boosting a priority of the application.

9. A computer program product for implementing lightweight interrupts for condition checking, the computer program product comprising:
a computer readable storage medium having program instructions embodied therewith, the program instructions readable by a processor to cause the processor to perform a method comprising:
determining, by a condition checker in a computer system, that a condition occurs for an application executing on the computer system;
based on determining that the condition occurs for the application, determining whether lightweight interrupts are enabled in a lightweight interrupt enable field in a particular instruction of the application, the application itself for which the condition occurred also comprising an interrupt handler; and
based on determining that lightweight interrupts are enabled, issuing a lightweight interrupt to the interrupt handler in the application itself for which the condition occurred and handling the condition by the interrupt handler in the application.

10. The computer program product of claim 9, wherein the condition is a determination, by the condition checker, that an instruction of the application does not meet a predetermined criterion.

11. The computer program product of claim 10, further comprising, based on determining that lightweight interrupts are not enabled in the lightweight interrupt enable field, issuing an interrupt to supervisor software and handling the instruction by the supervisor software, wherein the supervisor software is separate and distinct from the application.

12. The computer program product of claim 10, wherein the instruction comprises a trap or branch word (TOBW) instruction, and the predetermined criterion comprises a relationship between operands of the instruction with respect to a first register identifier and a second register identifier.

13. The computer program product of claim 10, wherein the instruction comprises a branch word immediate (BWI) instruction, and the predetermined criterion comprises a relationship between operands of the instruction with respect to a register identifier and an operand field.

14. The computer program product of claim 10, wherein the instruction comprises a load monitored range (LMR) instruction, and the predetermined criterion comprises loaded data indicating a memory address that is outside a particular address range.

15. The computer program product of claim 9, further comprising, based on the condition being an asynchronous condition occurring on the processor of the computer system, issuing the lightweight interrupt to the interrupt handler in the application to notify the application of the asynchronous condition.

16. The computer program product of claim 15, wherein the asynchronous condition comprises expiration of a timer comprising a boost timer that was set by a supervisor in response to temporarily boosting a priority of the application.

17. A computer system for lightweight interrupts for condition checking, the system comprising:
a memory; and
a processor communicatively coupled to said memory, the computer system configured to perform a method comprising:
determining, by a condition checker in the computer system, that a condition occurs for an application executing on the computer system;
based on determining that the condition occurs for the application, determining whether lightweight interrupts are enabled in a lightweight interrupt enable field in a particular instruction of the application, the application itself for which the condition occurred also comprising an interrupt handler; and
based on determining that lightweight interrupts are enabled, issuing a lightweight interrupt to the interrupt handler in the application itself for which the condition occurred and handling the condition by the interrupt handler in the application.

18. The computer system of claim 17, wherein the condition is a determination, by the condition checker, that an instruction of the application does not meet a predetermined criterion.

19. The computer system of claim 18, further comprising, based on determining that lightweight interrupts are not enabled, issuing an interrupt to supervisor software and handling the instruction by the supervisor software.

20. The computer system of claim 18, wherein the instruction comprises a trap or branch word (TOBW) instruction, and the predetermined criterion comprises a relationship between operands of the instruction.

* * * * *